United States Patent [19]

Miller, Jr.

[11] Patent Number: 4,673,727

[45] Date of Patent: Jun. 16, 1987

[54] NOVEL POLY(ESTER-AMIDE) COMPOSITIONS

[75] Inventor: George E. Miller, Jr., Savannah, Ga.

[73] Assignee: Union Camp Corporation, Wayne, N.J.

[21] Appl. No.: 868,632

[22] Filed: May 30, 1986

[51] Int. Cl.$^4$ .............................................. C08G 63/48
[52] U.S. Cl. .................................. 528/295.5; 106/28; 523/160; 524/602; 524/607; 528/288
[58] Field of Search ............................. 528/288, 295.5; 523/160; 106/28; 524/602, 607

[56] References Cited

U.S. PATENT DOCUMENTS

| | | | |
|---|---|---|---|
| 4,243,702 | 1/1981 | Walsh | 427/256 |
| 4,446,301 | 5/1984 | Belote et al. | 528/295.3 |
| 4,514,540 | 4/1985 | Peck | 524/514 |

*Primary Examiner*—Lucille M. Phynes
*Attorney, Agent, or Firm*—Kane, Dalsimer, Kane, Sullivan and Kurucz

[57] ABSTRACT

An improved poly(ester-amide) resin useful as a binder in printing inks. The resin comprises the hydroxyl-terminated ester of a diol with a polyamide which is the polymerization product of an excess of an acid mixture which comprises either a dimerized $C_8$–$C_{24}$ fatty acid or a $C_{19}$–$C_{21}$ diacid, a monomeric $C_{16}$–$C_{18}$ fatty acid, a monomeric $C_2$–$C_4$ fatty acid, and a mixture of diamines which comprises ethylenediamine, and a $C_6$ diamine.

10 Claims, No Drawings

4,673,727

NOVEL POLY(ESTER-AMIDE) COMPOSITIONS

BACKGROUND OF THE INVENTION

Field of the Invention

The present invention relates to a poly(ester-amide) composition useful as a binder component in printing inks.

Brief Description of the Prior Art

U.S. Pat. No. 4,066,585 describes printing inks wherein poly(ester-amides) are employed as binder components. The poly(ester-amide) used is the condensation product of essentially equivalent amounts of an acid component and an amine/alcohol component comprising a diamine and at least one member selected from the group consisting of diols and alkanolamines.

U.S. Pat. No. 3,900,436 describes poly(ester-amide) ink resins having improved adhesion due to the resin's hydroxyl functionality.

The present invention further improves upon the prior art poly(ester-amides) in that they exhibit enhanced solubility in alcohol, stability and increased hydroxyl functionality. Other advantages of the resins of the invention will be described below.

SUMMARY OF THE INVENTION

The invention comprises the hydroxy-terminated partial ester of:

(1) a diol; and
(2) the polymerization product of carboxylic acids and amines with 10–30% equivalent excess of acid comprised of:
  (a) 60–85 equivalent percent of a polyacid selected from the group consisting of dimer $C_8$–$C_{24}$ fatty acids and $C_{19}$–$C_{21}$ dicarboxylic acids;
  (b) 0–25 equivalent percent of a monomeric $C_{16}$–$C_{18}$ fatty acid; and
  (c) 15–40 equivalent percent of a monomeric $C_2$–$C_4$ fatty acid; and
(d) a mixture of diamines comprising:
  (i) 40–80 equivalent percent of ethylenediamine; and
  (ii) 10–45 equivalent percent of a $C_6$ diamine.

The resins of the present invention are characterized in part by enhanced freeze/thaw characteristics. The resins of the invention are useful as binders in flexographic printing inks, lacquers and rotogravure inks. Having hydroxyl functionality they will also be useful as cross-linkers with, for example, polyisocyanates in laminating adhesives.

DETAILED DESCRIPTION OF THE PREFERRED EMBODIMENTS OF THE INVENTION

The hydroxyl-terminated poly(ester-amides) of the invention are prepared by partial esterification of a diol with an acid group containing polyamide prepared by the random polymerization of a 10–30% equivalent excess of a particular mixture of acids with a particular mixture of diamines.

The esterification may be carried out by bringing together the polyamide and the diol under esterification conditions, advantageously in the presence of a catalytic proportion of an esterification catalyst.

A catalytic proportion of the esterification catalyst is generally within the range of from about 0.001 percent to about 20 percent by weight of the reaction mixture; preferably from about 0.1 to about 10 percent by weight and most preferably 0.5 to 5 percent.

Representative of esterification catalysts are organotin compounds such as tin oxalate and the like.

The desired esterification may be carried out at temperatures ranging from room temperature and below up to about 250° C.

The esterification may be carried out at subatmospheric or super-atmospheric pressures if desired. However, there is generally no great advantage to carrying out the process of the invention under other than ambient reaction vessel pressures occurring at the temperature under which the esterification reaction is conducted.

The esterification is generally complete within a period of from about 1 to about 10 hours, optimum periods being about 2 hours. It will be appreciated that the rate of reaction is influenced by a number of factors such as the temperature and pressure selected for carrying out the process of the invention. Higher temperatures will increase the rate of reaction but may also promote undesirable decompositions of ester product. Obviously, there is room for a compromise between time and temperatures and higher temperatures can be tolerated when short reaction times are available.

Progress of the esterification may be monitored employing conventional analytical techniques. For example, the cessation of water of esterification is indicative of the completion of the esterification. Aliquots of the product may also be taken for amine number, acid number, acid number and hydroxyl number calculation. Preferred compositions of the invention will have hydroxyl numbers of from 20 to 60, amine numbers of less than 10 and acid numbers of less than 10.

The product esters may be separated if desired from the crude reaction mixture upon completion of the desired esterification by conventional techniques, for example by stripping excess reactants and drying the resin product.

The diols which are partially esterified to obtain the compounds of the invention are organic diols, preferably aliphatic diols having from 2 to 8 carbon atoms, inclusive. Representative of such diols are, ethanediol, propanediol, butanediol, pentanediol, hexanediol, heptanediol, octanediol and isomeric forms thereof. Aliphatic diols are well known compounds as are the methods of their manufacture.

The polyamides used to partially esterify the diols to obtain the compounds of the invention may be prepared by the ordered polymerization of an excess of an acid component with a diamine component followed with a diol reactant of the type described above.

The acid component comprises 60 to 85 equivalent percent of a polyacid selected from the group consisting of the dimer of a $C_8$–$C_{24}$ fatty acid and a $C_{19}$–$C_{21}$ of a dicarboxylic acid.

Dimer fatty acids (sometimes referred to in the art as "polymeric fatty acids" are all well known as are the methods of their preparation. They are complex mixtures resulting from the polymerization of fatty acids. Representative of polymeric fatty acids are those commercially available from the polymerization of tall oil fatty acids. These polymeric fatty acids have a typical composition as follows:

| | % BY WEIGHT |
|---|---|
| $C_{18}$ monobasic acids (monomer) | 0–5 |

-continued

| | % BY WEIGHT |
|---|---|
| $C_{36}$ dibasic acids (dimer) | 60–95 |
| $C_{54}$ and higher polybasic acids (trimer) | 1–35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681.

A wide variety of $C_{19}$–$C_{21}$ dicarboxylic acids may be employed in the acid component to prepare the poly(esteramides) used in the invention, including aliphatic, cycloaliphatic and aromatic dicarboxylic acids. Representative of such acids, which may be used are 1,17-heptadecanedicarboxylic acid, 1,18-octadecanedicarboxylic acid, 1,19-monodecanediacarboxylic acid and the like.

A necessary component of the acid mixture used to prepare the poly(ester-amides)employed to partially esterify the diols is 15 to 40 equivalent percent of a $C_2$–$C_4$ fatty acid. Such acids are well known and include for example acetic, propionic and butyric acids. The inclusion of a $C_2$–$C_4$ fatty acid increases the polymer softening point, improves alcohol solubility and reduces molecular weight. This provides inks with better block resistance and allows higher solids inks (reducing organic solvent emissions).

Optionally, the acid component may also contain up to 25 equivalent percent of a $C_{16}$–$C_{18}$ fatty acid, for example, margaric acid, stearic acid, nondecylic acid and the like.

The diamine component employed to prepare the poly(esteramides) used in the esterification is a mixture of specific diamines. The first ingredient of the mixture is 40 to 80 equivalent percent of ethylenediamine and the second ingredient is 10 to 45 equivalent percent of a $C_6$ diamine. The use of $C_6$ diamines increases alcohol solubility and improves the low temperature ink stability to a commercially acceptable state. This increased stability also allows higher solids inks (reducing organic solvent emissions). Preferred as the $C_6$ diamines is 1,6-hexamethylene diamine. These diamine compounds are all prepared by well known methods and are commercially available.

The technique and general method of polymerizing the mixed reactants to prepare polyamides is generally well known; see for example U.S. Pat. Nos. 3,484,339 and 3,377,303.

The poly(ester-amides) esterified in the present invention may be prepared by charging a resin kettle with the polyamide forming reactants and diol in proportions as described above and heating the mixture to a temperature at which polymerization occurs. All of the reactants may be charged together to the reaction vessel or the diol may be charged after the polyamide forming reactants have been reacted to form a polyamide prepolymer. In general, heating of the reactants is to a temperature of from about 130 to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid. The heating of the reaction mixture may be carried out until selected acid number (preferably below about 50) is reached.

The relative quantities of the reactants are selected so that a substantial excess of reactive carboxyl groups relative to amine groups are present in the reaction mixture to produce an acid terminated pre-polymer, i.e., the acid number is greater than 10 units above the amine number.

The following examples describe the manner and the process of making and using the invention and set forth the best mode contemplated by the inventor for carrying out the invention but are not be construed as limiting.

Amine and acid numbers may be measured by conventional titrimetric analytical technique and are usually given as equivalents (or meqs.) of potassium hydroxide per gram of product.

Ball and ring softening points were determined by the test method described in ASTM test method 28-58T.

EXAMPLE 1

A two liter, four neck, round bottom flask fitted with a thermometer, mechanical stirrer, nitrogen inlet, collection trap and condenser is charged with the following reactants:

| | Weight | Equivalant % |
|---|---|---|
| dimer fatty acid (unidyne-18) | 746 g | 74 |
| propionic acid | 66.8 g | 26 |

This mixture is heated to a temperature of 80° C. and a mixture of the following diamines added:

| | Weight | Equivalant % |
|---|---|---|
| ethylenediamine (EDA) | 62.7 g | 60 |
| hexamethylenediamine (HMDA) | 40.6 g | 20 |

The resulting mixture is then heated to a temperature of 140–200° C. and held at this temperature for 30–90 minutes until completion of the polyamide formation. At this point, the flask is cooled to a temperature of 140° C. and there is added:

| | Weight | Equivalant % |
|---|---|---|
| 1,6-hexanediol (HDO) | 81.8 g | 40 |

The resulting reaction mixture is heated to a temperature of 200° C. and the water evolved during the reaction is distilled out. When the acid number decreases below 20, 1 gram of tin oxalate esterification catalyst (Fascat 2001) is added to esterify the polymer. The resulting hydroxyl-terminated polymer is steamed and vacuumed after the acid and amine numbers are below 10. The reaction mixture is then cooled to 180° C. and discharged. The product resin physical properties are listed in Table I, below.

EXAMPLES 2–4

These are not examples of the invention but are made for purposes of comparison. The procedure of Example 1, supra is repeated except that the proportions of reactants are changed and/or the reactants are changed. Proportions, reactants and physical properties are set forth in Table I, below.

EXAMPLES 5-6

These are not examples of the invention but are made for the purposes of comparison. The procedure of Example 1, supra is repeated except that the proportions of reactants is changed and/or the reactants are changed. Proportions, reactants and physical properties are set forth in Table I, below.

EXAMPLES 7-11

The procedure of Example 1, supra is repeated except that the proportion of reactants is changed and/or the reactants are changed. Proportions, reactants and physical properties are set forth in Table I below. The compositions of examples 9-11 are useful in high solids printing compositions which reduce emission of organic solvent vapor.

-continued

|  | A | B |
|---|---|---|
| Clarity, 50% n.v. in n-propanol | 5 | 5 |
| Solubility in 95% ethanol | 27.2% | 29.0% |
| Solubility in Anhydrous Ethanol | 4.7% | 8.8% |
| Brookfield viscosity @ 160° C. | 186 cps | 190 cps |
| Gel Point | +10° F. | +28° F. |

What is claimed is:
1. The hydroxy-terminated partial ester of:
   (I) a diol; and
   (II) the polymerization product of carboxylic acids and amines with 10-30% equivalent excess of acid comprised of:
   (a) 60-85 equivalent percent of a polyacid selected from the group consisting of dimer $C_8$–$C_{24}$ fatty acids and $C_{19}$–$C_{21}$ dicarboxylic acids;

TABLE I

| Examples: | 1 | Control 2 | Control 3 | Control 4 | Control 5 | Control 6 | Control 7 | 8 | 9 | 10 | 11 |
|---|---|---|---|---|---|---|---|---|---|---|---|
| Component - equivalent percent | | | | | | | | | | | |
| Unidyne-18* | 74 | 74 | 74 | 74 | 74 | 64 | 74 | 74 | 65 | 65 | 50 |
| Unitol-BKS** | — | 26 | 26 | 26 | — | — | — | — | — | — | 25 |
| propionic acid | 26 | — | — | — | 26 | 26 | 26 | 26 | — | 35 | 25 |
| acetic acid | — | — | — | — | — | — | — | — | 35 | — | — |
| adipic acid | — | — | — | — | — | 10 | — | — | — | — | — |
| EDA | 60 | 80 | 73.3 | 73.3 | 80 | 80 | 60 | 70 | 60 | 60 | 60 |
| HMDA | 20 | — | — | — | — | — | 20 | 20 | 20 | 20 | 20 |
| HDO | 40 | 40 | — | — | 40 | 40 | — | 20 | 40 | 40 | 40 |
| glycerine | — | — | — | 40 | — | — | — | — | — | — | — |
| trimethylol-propane | — | — | 40 | — | — | — | — | — | — | — | — |
| butanediol | — | — | — | — | — | — | 40 | — | — | — | — |
| Theoretical Hydroxyl Number | 38.9 | 33.2 | 23.0 | 22.6 | 39.7 | 43.1 | 39.7 | 20.1 | 42.6 | 41.8 | 38.8 |
| Softening pt., °C. | 115 | 94 | 94 | 91 | 131 | 178 | 116 | 124 | 107 | 121 | 111 |
| Acid Number | 2.2 | 3.1 | 5.0 | 8.6 | 2.7 | 3.7 | 6.2 | 5.9 | 2.9 | 2.6 | 2.4 |
| Amine Number | 2.0 | 2.1 | 1.5 | 1.2 | 1.6 | 2.1 | 1.7 | 1.8 | 1.8 | 1.7 | 3.1 |
| Visc. @ 160° C., cps | 195 | 123 | 183 | 166 | 165 | 65 @ 220° C. | 163 | 222 | 124 | 110 | 48 |
| Gardner-Holdt visc. 50% npoh | E-F | B-C | E— | D | A-A1 | gel | E+ | G+ | D | C | A-A1 |
| Color 50% NPOH | 7 | 6 | 7 | 7 | 7— | — | 7 | 7 | 6+ | 7— | 6 |
| Solubility in: | | | | | | | | | | | |
| 95% ethanol | 25 | 47 | 50 | 50 | gel | gel | 23 | 23 | 15 | 16 | 13 |
| anhydrous ethanol | INF. | 31 | 50 | 50 | 9 | gel | INF | INF | 12 | 14 | 8 |
| Gel Point, °F.* | 12 | 48 | Emulsion | Emulsion | 27 | RT | 12 | 22 | 8 | 10 | 20 |

*Unidyne 18: Union Comp Corporation, Wayne NJ having the composition: (Please complete)
**Unitol-BKS: Union Comp Corporation, Wayne NJ having the composition: (Please complete)

EXAMPLE 12

The procedure of Example 1 is repeated twice except that the proportion of diamine is varied as follows:

|  | Formula A | Formula B |
|---|---|---|
| Ethylene Diamine | 35.0 | 70.0 |
| Hexamethylene Diamine | 45.0 | 10.0 |

The physical characteristics of the products obtained are:

|  | A | B |
|---|---|---|
| Acid Number | 1.3 | 2.0 |
| Amine Number | 2.5 | 2.9 |
| Softening Point | 95° C. | 127° C. |
| G/H viscosity, 50% n.v. in n-propanol | F-G | E |
| Color, 50% n.v. in n-propanol | 6+ | 6+ |

(b) 0-25 equivalent percent of a monomeric $C_{16}$–$C_{18}$ fatty acid; and
(c) 15-40 equivalent percent of a monomeric $C_2$–$C_4$ fatty acid; and
(d) a mixture of diamines comprising:
   (i) 40-80 equivalent percent of ethylenediamine; and
   (ii) 10-45 equivalent percent of a $C_6$ diamine.
2. The polyesteramide of claim 1 wherein said diol is 1,6- hexanediol.
3. The polyesteramide of claim 1 wherein said diol is 1,4- butanediol.
4. The polyesteramide of claim 1 wherein said monomeric $C_2$–$C_4$ fatty acid is propionic acid.
5. The polyesteramide of claim 1 wherein said $C_6$ diamine is hexamethylenediamine.
6. A printing ink, which comprises:
   (I) pigment
   (II) A hydroxyl-terminated poly(ester-amide) of:
      (A) a diol; and (B) the polymerization product of carboxylic acids and amines with a 10–30% equivalent excess of acid comprised of:
(a) 60–85 equivalent percent of a polyacid selected from the group consisting of dimer $C_8$–$C_{24}$ fatty acids and $C_{19}$–$C_{21}$ dicarboxylic acids;
(b) 0–25 equivalent percent of a monomeric $C_{16}$–$C_{18}$ fatty acid; and
(c) 15–40 equivalent percent of a monomeric $C_2$–$C_4$ fatty acid; and
(d) a mixture of diamines comprising:
(i) 40–80 equivalent percent of ethylenediamine; and
(ii) 10–45 equivalent percent of a $C_6$ diamine;
(III) a solvent carrier
(IV) an organic titanate crosslinking agent.

7. The ink of claim 6 wherein said diol is 1,6-hexanediol.

8. The ink of claim 6 wherein said diol is 1,4-butanediol.

9. The ink of claim 6 wherein said monomeric $C_2$–$C_4$ fatty acid is propionic acid.

10. The ink of claim 6 wherein said $C_6$ diamine is hexamethylenediamine.

* * * * *